US012530979B2

(12) United States Patent
Laluque et al.

(10) Patent No.: US 12,530,979 B2
(45) Date of Patent: Jan. 20, 2026

(54) METHOD FOR COMMUNICATION BETWEEN AN AIR TRAFFIC CONTROL SYSTEM AND A COMMUNICATION MODULE

(71) Applicant: THALES, Meudon (FR)

(72) Inventors: Laurent Laluque, Merignac (FR); Chris Deseure, Toulouse (FR); Jacques Edeline, Elancourt (FR); Laurent Flotte, Toulouse (FR); David Laville, Elancourt (FR)

(73) Assignee: THALES, Meudon (FR)

(*) Notice: Subject to any disclaimer, the term of this patent is extended or adjusted under 35 U.S.C. 154(b) by 140 days.

(21) Appl. No.: 18/286,545

(22) PCT Filed: Apr. 14, 2022

(86) PCT No.: PCT/EP2022/060037
§ 371 (c)(1),
(2) Date: Oct. 11, 2023

(87) PCT Pub. No.: WO2022/223433
PCT Pub. Date: Oct. 27, 2022

(65) Prior Publication Data
US 2024/0304096 A1 Sep. 12, 2024

(30) Foreign Application Priority Data
Apr. 20, 2021 (FR) ....................................... 2104089

(51) Int. Cl.
*G08G 5/34* (2025.01)
*G08G 5/55* (2025.01)
(Continued)

(52) U.S. Cl.
CPC ................. *G08G 5/34* (2025.01); *G08G 5/55* (2025.01); *G08G 5/56* (2025.01); *G08G 5/59* (2025.01); *G08G 5/76* (2025.01)

(58) Field of Classification Search
CPC .. G08G 5/34; G08G 5/76; G08G 5/56; G08G 5/55; G08G 5/59
See application file for complete search history.

(56) References Cited

U.S. PATENT DOCUMENTS 9,224,302 B1 * 12/2015 Young ...................... G08G 5/76
2009/0204453 A1 * 8/2009 Cooper ................ G05D 1/0005 705/7.36
(Continued)

OTHER PUBLICATIONS

Dalmau, et al., "Fuel and time savings by flying continuous cruise climbs Estimating the benefit pools for maximum range operations", Transportation Research Part D: Transport and Environment, vol. 35, Mar. 2015.
(Continued)

*Primary Examiner* — Kenneth M Dunne
(74) *Attorney, Agent, or Firm* — Baker Hostetler

(57) ABSTRACT

A method for communication between an air traffic control system and a communication module, the communication method includes a step of determining environmental optimization time slots based on the air traffic absorption capacities of the various flight information regions, the environmental optimization time slots at least partially covering one or more flight information regions, each environmental optimization time slot having an associated efficiency level; a step of negotiation, between the pilot via the communication module and the air traffic control system, to negotiate changes to the flight plan on the basis of the environmental optimization time slots and the environmental optimization levels of the environmental optimization time slots.

12 Claims, 7 Drawing Sheets

(51) Int. Cl.

| | |
|---|---|
| ***G08G 5/56*** | (2025.01) |
| ***G08G 5/59*** | (2025.01) |
| ***G08G 5/76*** | (2025.01) |

(56) References Cited

U.S. PATENT DOCUMENTS

| | | | | |
|---|---|---|---|---|
| 2010/0030401 | A1* | 2/2010 | Rogers | G01C 23/00<br>701/3 |
| 2011/0251781 | A1* | 10/2011 | Brennan | G08G 5/30<br>701/120 |
| 2012/0257684 | A1 | 10/2012 | Vasek et al. | |
| 2013/0184978 | A1* | 7/2013 | Subbu | G08G 5/56<br>701/120 |
| 2014/0300495 | A1 | 10/2014 | Scheu et al. | |
| 2016/0019795 | A1 | 1/2016 | Chircop et al. | |
| 2016/0093219 | A1* | 3/2016 | Bailey | G08G 5/21<br>701/120 |
| 2017/0069213 | A1 | 3/2017 | Thomas et al. | |
| 2019/0088147 | A1 | 3/2019 | Kusuma et al. | |
| 2021/0256856 | A1* | 8/2021 | Venkataramana | G06Q 10/047 |

OTHER PUBLICATIONS

Grewe, et al., "Mitigating the Climate Impact from Aviation: Achievements and Results of the DLR WeCare Project", Aerospace, 4, 34, 2017.
"Taxonomy & Definitions for Operational Design Domain (ODD) for Driving Automation Systems J3259", SAE J3016, 2021. https://www.sae.org/standards/content/j3259/.
Jackson, et al., "The 4D trajectory data link (4DTRAD) service—Closing the loop for air traffic control", 2009 Integrated Communications, Navigation and Surveillance Conference, 2009.
Kuenz, et al., "Optimization without limits—The world wide air traffic management project", 2017 IEEE/AIAA 36th Digital Avionics Systems Conference (DASC), 2017.
Rosenow, et al., "Impact of climate costs on airline network and trajectory optimization: a parametric study", CEAS Aeronautical Journal, vol. 8, pp. 371-384, 2017.

* cited by examiner

METHOD FOR COMMUNICATION BETWEEN AN AIR TRAFFIC CONTROL SYSTEM AND A COMMUNICATION MODULE

CROSS-REFERENCE TO RELATED APPLICATIONS

This application is a National Stage of International patent application PCT/EP2022/060037, filed on Apr. 14, 2022, which claims priority to foreign French patent application No. FR 2104089, filed on Apr. 20, 2021, the disclosures of which are incorporated by reference in their entireties.

FIELD OF THE INVENTION

The present invention relates to a method for communication between an air traffic control system and a communication module, to an associated air traffic control system and to an associated electronic terminal.

BACKGROUND

As air traffic has been steadily increasing since its inception, the workload and the number of tasks to be performed by air traffic controllers via an air traffic control system are complex and are increasing accordingly.

There is a need to improve aircraft flight procedures and flight plans in such a way as to best manage available airspace and available equipment such as runways.

A flight plan is the detailed description of the route to be followed by an aircraft as part of a planned flight. It comprises notably a chronological sequence of waypoints that are described by their position, their altitude and their overflight time. When constructing the flight plan, a certain number of enforced rules must be complied with so as to ensure a distance between aircraft in airspace. Checks are also carried out so as to ensure that the various flight plans that are filed are compatible with one another. Waypoints constitute the reference trajectory to be followed by the aircraft with a view to best complying with its flight plan. This trajectory is a valuable aid, both to ground control personnel and to the pilot, in terms of anticipating the movements of the aircraft, for example an airplane, and thus ensuring an optimum level of safety, notably in the context of maintaining aircraft separation criteria. The flight plan is currently managed on board civil aircraft using a flight management system (FMS), which makes the reference trajectory available to on-board personnel and to the other on-board systems. Essentially in the interests of safety, it is therefore necessary to ensure that the aircraft follows the reference trajectory described in the flight plan, at least in geographical and temporal terms.

In addition to this safety issue, there is awareness of the impact of air traffic on the environment. Various studies have highlighted this environmental impact.

The German Aerospace Center has thus published works on this subject, such as the publication "Mitigating the Climate Impact from Aviation: Achievements and Results of the DLR WeCare Project". That publication describes restricted climate zones in which the passage of an aircraft would have adverse consequences for the environment.

The University of Catalonia describes the concept of perfect flight in the ecological sense in Dalmau & Prats (2015): "Fuel and Time Savings by Flying Continuous Cruise Climbs: Estimating the Benefit Pools for Maximum Range Operations".

Such works should be placed in parallel with studies in the development of autonomous cars, such as the definition of "the automotive operating design domain" published in SAEJ3016 ("Operating conditions under which a given driving automation system or feature thereof is specifically designed to function, including, but not limited to, environmental, geographical, and time-of-day restrictions, and/or the requisite presence or absence of certain traffic or roadway characteristics").

This environmental optimization problem is solved at present through flight efficiency, which consists in taking the shortest possible trajectories. Thus, the ecological aspect of flights is taken into consideration only through the prism of $CO_2$ emission levels resulting from aircraft fuel consumption. The various players (airlines, pilots, air traffic controllers) seek, above all, to minimize this consumption for economic reasons. On the air traffic control system side, the objective is, above all, to ensure flight safety in line with demand in terms of traffic volume. The air traffic controller's priority is therefore, first and foremost, to ensure the safety of the flight. Due to their workload, they might not be available to deal with the ecological aspect of the flight. In addition, each player, be they a pilot or air traffic controller, has only a piecemeal view of the situation. Indeed, the pilot does not know the constraints of the air traffic control system (air traffic control workload, technical problem, etc.), and they have at best only a partial view of the surrounding traffic. The air traffic controller, for their part, does not know the constraints of the pilot and their airline (maneuvering margin in terms of arrival delay, intention of flights to optimize trajectory, etc.). They also do not now the characteristics, notably in terms of performance, of the various aircraft.

There is therefore a need to propose a communication method that improves the consideration of constraints and optimization intentions by pilots, on the one hand, and by air traffic controllers, on the other hand.

SUMMARY OF THE INVENTION

The present invention aims to remedy this need at least in part.

More particularly, the present invention aims to allow an air traffic control system to define and regularly publish a space-time during which trajectory optimizations in line with an environmental criterion are promoted, and to support, in a well-equipped manner, the exchanges of information needed for said optimizations.

A first subject of the invention relates to a method for communication between an air traffic control system and a communication module. The communication module is designed to be used by a pilot of an aircraft to negotiate changes to a flight plan of said aircraft, and the air traffic control system is designed to be used by an air traffic controller to control air traffic in an airspace. The airspace is divided into a plurality of flight information regions, each flight information region having a certain capacity to absorb said air traffic. The communication method comprises a step of determining environmental optimization time slots based on the air traffic absorption capacities of the various flight information regions. The environmental optimization time slots at least partially cover one or more flight information regions of the airspace, each environmental optimization time slot having an associated environmental optimization level. The method also comprises a step of negotiation, between the pilot via the communication module and the air traffic control system, to negotiate changes to the flight plan on the basis of the environmental optimization time slots and their associated environmental optimization level.

The communication method thus promotes negotiation of a new flight plan between the pilot and the air traffic controller. Indeed, by determining environmental optimization time slots and by determining environmental optimization levels associated with said environmental optimization time slots, the air traffic control system indicates that one or more air traffic controllers are more or less available to promote ecological optimization of the flight plan in a given flight information region. The captain and/or the co-pilot are then encouraged to share their thoughts on how to improve their flight, notably in terms of ecological footprint, with a better chance of being taken into consideration by air traffic controllers. Air traffic controllers are also naturally encouraged to become even more active in order to deal with this ecological aspect and to suggest changes to the flight plan to the captain and/or co-pilot. In addition, the pilot, via the electronic terminal, and the various air traffic controllers involved in an optimization, via the air traffic control system, share the various parameters of which they are aware with greater efficiency. This promotes the emergence of a consensus between the various parties in terms of determining the new optimized and personalized flight plan according to the intentions and possibilities of each player.

In one particular embodiment, the communication module is an electronic terminal designed to receive said environmental optimization time slots or a radio terminal with a digital or non-digital voice link.

The electronic terminal corresponds to a smart terminal capable of improving the negotiation between the pilot and the control system and of automatically implementing flight plan changes in the aircraft. The radio terminal is more conventional, and allows information to be exchanged (for example by radio, voice or datalink) between the pilot and the control system, but it is the pilot who manually implements the negotiated changes to the flight plan.

In one particular embodiment, the environmental optimization time slots and the associated efficiency levels are determined based on at least one parameter selected from among a list of parameters comprising at least:

an environmental objective;

a maneuvering margin;

an availability of the air traffic controller.

In one particular embodiment, the air traffic absorption capacity of the flight information regions is determined on the basis of an air traffic volume and/or a complexity of said air traffic and/or weather conditions.

In one particular embodiment, the environmental objective is selected from among a list of environmental objectives comprising at least:

limiting $CO_2$ emissions;

limiting NOx emissions;

limiting $CH_4$ emissions;

limiting water vapor emissions;

limiting effects induced by condensation trails.

In one particular embodiment, the changes to the flight plan are chosen from among a list of changes comprising at least:

a change of trajectory of the aircraft;

a change of altitude of the aircraft;

a change of speed of the aircraft.

In one particular embodiment, the communication method comprises a step of the air traffic control system sending an ATC clearance message to the communication module, said ATC clearance message being designed to validate changes to the flight plan, said changes having been negotiated in the negotiation step.

In one particular embodiment, the step of negotiation between the communication module and the air traffic control system is carried out before the start of the aircraft flight and/or in flight.

Another subject of the invention relates to an air traffic control system designed to be used by an air traffic controller to control air traffic in an airspace, said airspace being divided into a plurality of flight information regions, each flight information region having a certain capacity to absorb said air traffic, said air traffic control system comprising:

a control module, said control module being designed to determine the air traffic absorption capacity for each flight information region;

an environment module, said environment module being designed to determine environmental optimization time slots based on the air traffic absorption capacities of the various flight information regions, said environmental optimization time slots at least partially covering one or more flight information regions of the airspace, each environmental optimization time slot having an associated efficiency level, said environment module being designed to negotiate changes to a flight plan of an aircraft intended to pass through the airspace, said changes being determined on the basis of the environmental optimization time slots and the efficiency levels of said environmental optimization time slots.

Another subject of the invention relates to an electronic terminal designed to be used by a pilot of an aircraft to negotiate changes to a flight plan of said aircraft, said aircraft being intended to pass through an airspace, said airspace being divided into a plurality of flight information regions, each flight information region having a certain air traffic absorption capacity, said electronic terminal comprising:

a visualization block for visualizing environmental optimization time slots and efficiency levels associated with said slots, said environmental optimization time slots at least partially covering one or more flight information regions of the airspace, said environmental optimization time slots and the efficiency levels associated with said environmental optimization time slots being determined based on the air traffic absorption capacities of the various flight information regions;

a negotiation block, said negotiation block being designed to negotiate changes to the flight plan of said aircraft on the basis of the environmental optimization time slots and the efficiency levels of said environmental optimization time slots.

BRIEF DESCRIPTION OF THE DRAWINGS

The present invention will be better understood on reading the detailed description of embodiments which are given by way of non-limiting examples and illustrated by the appended drawings, in which.

DETAILED DESCRIPTION

The invention is not limited to the embodiments and variants presented, and other embodiments and variants will be clearly apparent to a person skilled in the art.

Figure 1:
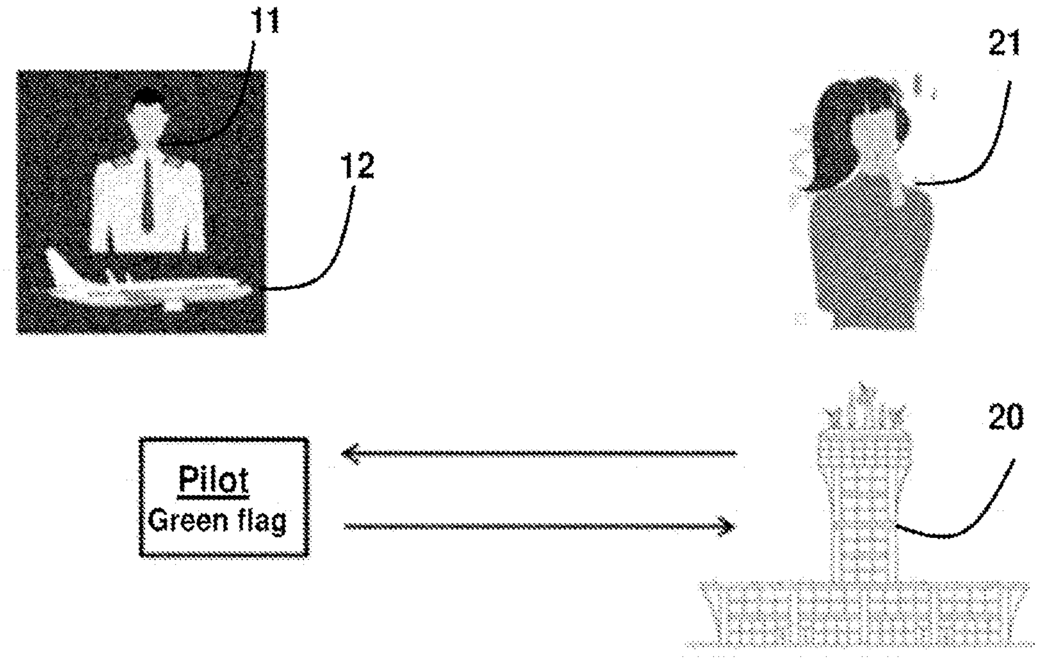
FIG. 1 illustrates the various players in a communication method according to the invention.

FIG. 1 globally illustrates a communication architecture between a communication terminal (Pilot Green flag) and an air traffic control system 20. The communication terminal (Pilot Green flag) is designed to be used by a pilot 11 of an aircraft 12 with a view to negotiating changes to a flight plan of this aircraft 12. In one preferred embodiment, this communication terminal 101 is in the form of a tablet able to be transported easily by the pilot 11. The air traffic control system 20 is designed, for its part, to be used by an air traffic controller 21 with a view to controlling air traffic in a given airspace.

Figure 2:
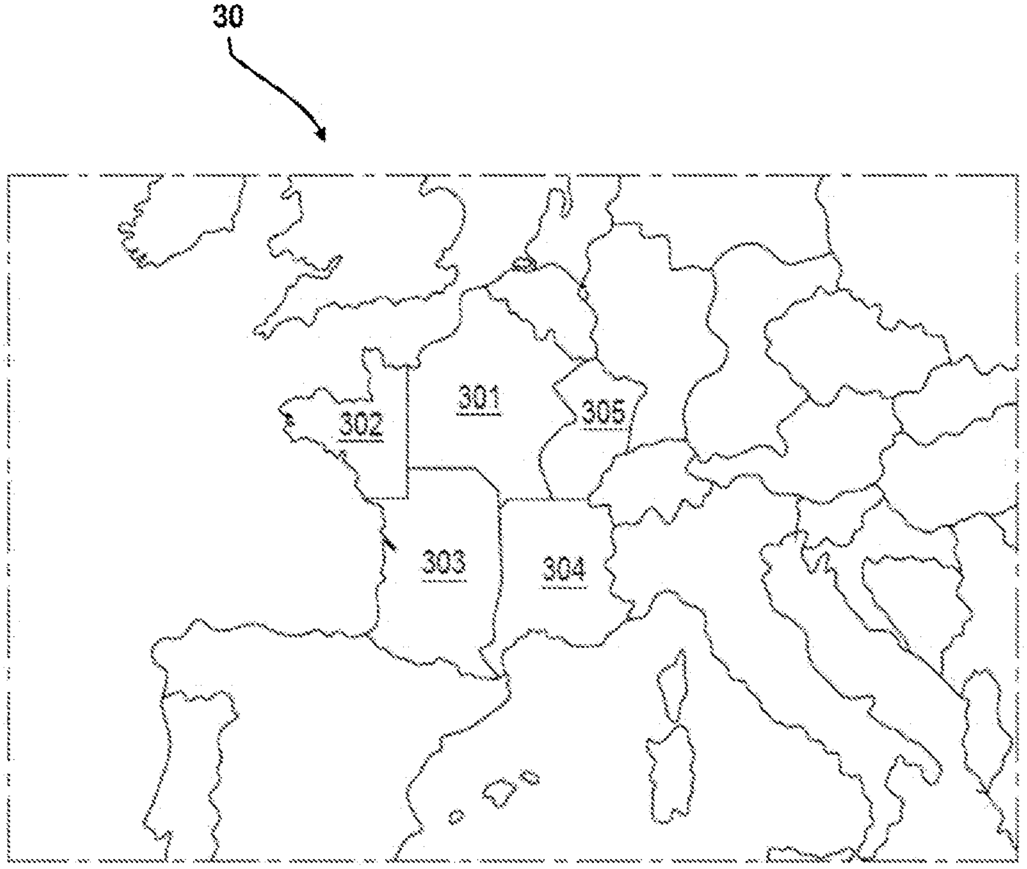
FIG. 2 illustrates an airspace divided into a plurality of flight information regions according to the prior art.

Such an airspace 30 is illustrated notably in FIG. 2. In this FIG. 2, the airspace is centered on France and comprises five flight information regions or sectors 301-305, which may encompass multiple geographical regions or multiple parts of a geographical region. The first flight information region 301 thus covers Hauts-de-France, ile de France, part of Normandy, part of Grand-Est, part of Centre-Val de Loire and part of Bourgogne-Franche-Comte. The second flight information region 302 covers Brittany, the other part of Normandy, part of Pays de Loire and part of the French territorial waters of the Atlantic Ocean. The third flight information region 303 covers Nouvelle-Aquitaine, part of Occitanie, and the other part of Centre-Val de Loire. The fourth flight information region 304 covers Auvergne-Rhone-Alpes, the other part of Occitanie, Provence-Alpes-Côte d'Azur, Corsica and part of the French territorial waters of the Mediterranean. The fifth flight information region 305 covers the other part of Grand-Est and the other part of Bourgogne-Franche-Comte. Each flight information region 301-305 has a certain air traffic absorption capacity.

Figure 3:
FIG. 3 illustrates environmental optimization time slots determined according to the communication method of the invention, said slots at least partially covering one or more flight information regions of the airspace of FIG. 2.

FIG. 3 illustrates environmental optimization time slots, and therefore five are specifically referenced 401-405 here. These time slots 401-405 at least partially cover one or more flight information regions 301-305 illustrated in FIG. 2. The time slots thus form, with parts of the flight information regions 301-305, 4-dimensional space-times in which negotiation between the pilot and the air traffic controller is possible in order to optimize the flight plan from an environmental point of view. In these space-times, aircraft may fly with the most ecological trajectory possible, independently of the other constraints of the invention. Under these conditions, ecological flight procedures are made technically possible: continuous climb and descent. Local optimizations (change of flight level to access favorable winds for example) are all accepted by the controllers, who remain responsible for maintaining separations and therefore the safety of the aircraft.

These space-times are declared by the air traffic control system 20 on the basis of various criteria that may be combined and weighted, such as:

- workload of air traffic control;
- availability of controllers in terms of resources;
- target environmental objectives;
- levers available to achieve the environmental objectives.

The workload of air traffic control is determined taking into consideration:

- the volume of traffic expected over the flight information region over the various time windows under consideration;
- the complexity of the traffic. This stems directly from the risks of potential conflicts between aircraft present over one and the same flight information region in the same time window (n well separated aircraft, on parallel flows, represent less complexity compared to n aircraft entering the sector at opposite points and flying along converging trajectories, the effort to manage them is therefore quite different);
- the complexity of the weather situation (presence of dangerous convections, strong winds, "windshear", etc.).

The target environmental objectives are, for example:

- an improvement in $CO_2$ emissions;
- a reduction in global emission levels (therefore beyond $CO_2$) of GWP100 type, taking into consideration:
  - $CO_2$ emissions;
  - $NO_x$ emissions;
  - $CH_4$ emissions;
  - the effects induced by condensation trails ("contrails").

The levers available to achieve the environmental objectives are:

- favorable weather within the flight information region: wind, temperature, pressure ("jet stream", "contrails");
- a favorable climate within the flight information region: solar radiation, methane, ozone;
- procedures available via *LOA* ("Letters of Agreement") for transfers from and to adjacent zones (continuous climb, continuous descent, direct, etc.) along with the possibilities/facilities of negotiating transfer conditions with flight information regions.

Each space-time is determined in advance based on the provisional values of each of the criteria. It may thereafter be readjusted throughout the day on the basis of the evolution of the criteria taken into consideration.

In addition to determining characteristics of the space-time, these same criteria may be used to determine various efficiency levels N1, N2, N3. For example, considering only the controller workload as criterion, it is possible to determine:

- a first, "maximum" level N1 in which the controller has the ability to accept/suggest all types of pilot requests (under the proviso of being capable of ensuring flight safety) and to negotiate out-of-procedure transfers from and to adjacent sectors;
- a second, "medium" level N2 in which the controller is able to study/suggest all types of optimizations that are however limited to their flight information region. In this case, they cannot guarantee a negotiation capability with adjacent flight information regions;
- a third, "light" level N3 in which the controller is able only to study/suggest certain types of optimization (for example, a continuous and direct descent).

In a practical manner, the criteria for determining a space-time may be applied:

- globally over an FIR ("Flight Information Region");
- over each of the various sub-regions of an FIR. In this case, the logic that is selected consists in grouping together, on one and the same efficiency level, the various sub-sectors managed by one and the same controller/pair of controllers;

over a zone covering a given "city pair" (triptych of departure airport, arrival airport, route).

In a space-time, the players are able to collaboratively develop trajectories according to ecological criteria, pooling suggestions from the ground and from on board. Thus, in this space-time, ecological procedures become the default procedures.

In addition, a space-time makes it possible to manage aircraft differently from the rules usually in force, by physically isolating said aircraft in time and space. It is therefore possible to surpass the traditional principles of segregating and delivering aircraft between flight information regions to support maximum traffic under the worst conditions. The trajectory of the aircraft may then be controlled subject to one priority parameter independently of the others. For example, it is customary to segregate arriving and departing flows by making them intersect in different volumes. The rules defining these volumes are strict and planned in advance. In an environmental optimization time slot, the ATC ("Air Traffic Controller") may have the human and material capacity to ensure the safety of certain flights while optimizing the arrival and departure trajectories in terms of emission via for example personalized aircraft monitoring, making it possible to partially or completely overcome the usual segregation rules.

In addition, the space-time makes it possible to organize the work of controllers taking into consideration not only the volume of traffic, but also conditions external thereto. Indeed, in a conventional optimization scheme, it would be sought to work on the aircraft itself as well as the interactions that the aircraft has with other aircraft. Here, the parameters concern the environment external to the aircraft as well as the proactivity of ATC in order to create global optimizations and to push pilots and airlines to seek local optimizations. Thus, to be capable of ensuring an environmental optimization time slot, ATC may structure itself differently by grouping together or ungrouping for example a flight information region into sub-regions and by putting more human resources in the sub-regions covered by said time slot. It is thus possible to manage emission levels more finely. This has the advantage of taking into consideration changes to the environment in an optimum manner. Thus, for example, a change in the atmosphere in terms of humidity, temperature and/or pressure may lead to a change in the classification of a space within an hour, because it is likely to generate condensation trails. In this case, air traffic control could prohibit certain traffic flows from passing through the zone because the compromise between fuel consumption (CO2 emission) and condensation trails is not favorable, whereas, for other flows, it is better to pass through the sub-sector. In the same way, by signaling this space-time, ATC indicates for example that it is able to take the time to negotiate a main path between the FIR with the next controller, thus adapting the aircraft delivery rules in force for a given flow of aircraft.

A new space-time may be broadcast to airlines and pilots through messages published by government agencies, called NOTAM Green Ops. These messages make it possible to broadcast the characteristics of the space-time and also possibly maneuvering margins of ATC. The evolution of the space-time may also be transmitted through these same NOTAM Green Ops. They may also be exchanged with pilots via the digital channels used to negotiate with ATC.

Under these conditions, the main mission of the pilot and controller becomes that of minimizing the ecological footprint of the aircraft. They may therefore take advantage of any new opportunity to:

avoid zones of condensation trails, zones conducive to the formation of ozone (climatic opportunity);

take advantage of favorable weather (weather opportunity);

apply the lowest-consumption engine speed (engine speed opportunity);

take the shortest routes (trip opportunity).

These real-time suggestions may be initiated by human players or software. Said software will be designed to comply with business rules or recognized best practice in mass learning of data.

In FIG. 3, the time slots 401 to 405 are of any shape. Thus, a first time slot 401 with a generally rectangular shape partially covers the first flight information region 301, the second flight information region 302 and the third flight information region 303. A second time slot 402 with a generally rectangular shape partially covers the second flight information region 302. A third time slot 403 with a generally rectangular shape partially covers the third flight information region 303. A fourth time slot 404 with a generally rounded elongate shape partially covers the fourth flight information region 304. The various time slots may overlap. Thus, the first time slot 401 has a part in common with the second time slot 402. In the same way, the first time slot 401 has a part in common with the fifth time slot 405.

Each environmental optimization time slot 401-405 has an environmental optimization level N1, N2, N3, with N1>N2>N3. It will be recalled that this environmental optimization level illustrates availability of the air traffic control system to negotiate in the associated optimization time slot to optimize the flight plan. The higher this level, the greater this availability. In FIG. 3, the first time slot 401 has a low availability level N1. The second time slot 402 has an intermediate availability level N2. The third time slot 403, the fourth time slot 404 and the fifth time slot 405 have high availability levels N3.

Again, it should be noted that the time slots may at least partially cover multiple flight information regions 301-305. This makes it possible to maintain a flight plan that is optimized from an environmental point of view, even when changing flight information region.

Figure 4:
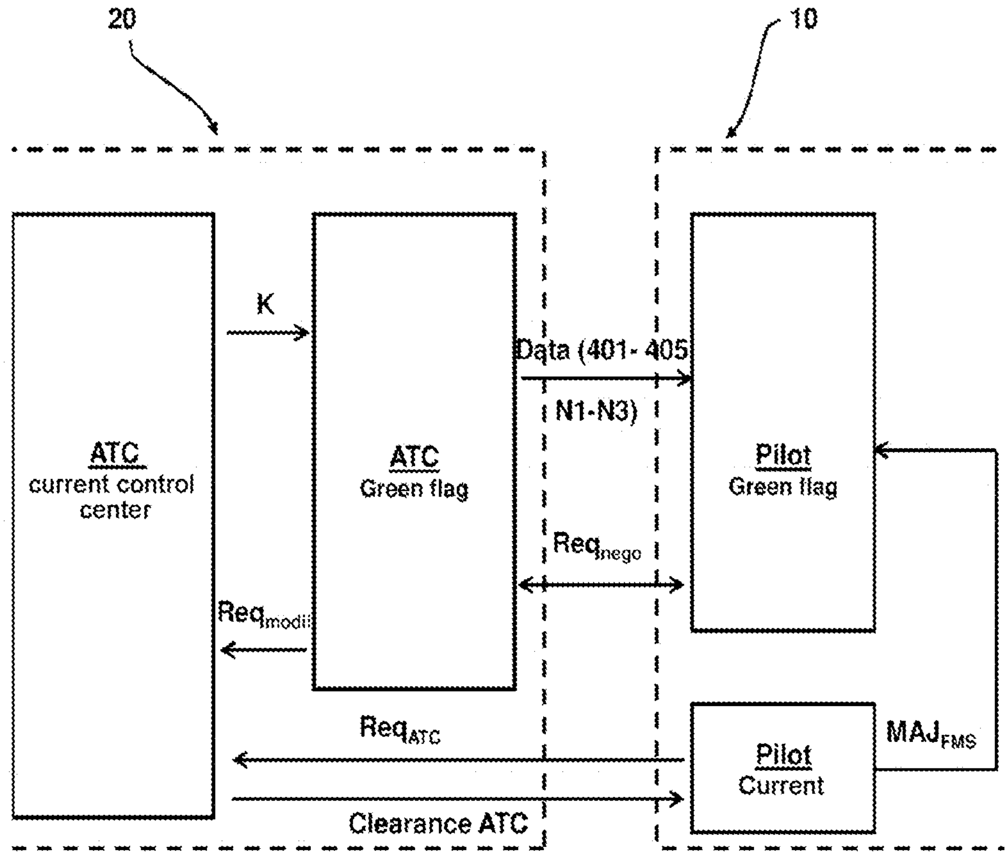
FIG. 4 schematically illustrates a global architecture for implementing the communication method according to the invention, said global architecture comprising an environment module ATC Green flag and an electronic terminal.

FIG. 4 illustrates a general architecture for implementing a method for communication according to the invention between the air traffic control system 20 and the electronic terminal Pilot Green flag. This general architecture thus comprises an air traffic control domain 20 and a pilot domain 10, each of these domains being delimited by dotted lines. The air traffic control domain is represented by the air traffic control system 20. The pilot domain 10 comprises the electronic terminal Pilot Green flag and an on-board electronic module Pilot current.

More particularly, the air traffic control system 20 comprises:

a control module ATC current control center;

an environment module ATC Green flag.

The control module ATC current control center is designed to determine and transmit:

an air traffic absorption capacity K for each flight information region 301, 302, 303, 304, 305;

an ATC clearance authorization message, said authorization message being designed to validate changes to the flight plan of the aircraft 12. This ATC clearance authorization message is transmitted by a conventional ground/on-board communication channel (voice, CPDLC (for "controller-pilot data link communications") datalink).

The control module ATC current control center is also designed to receive:

- a change request $Req_{modif}$, said change request $Req_{modif}$ containing one or more ground/on-board selected flight plan changes;
- an ATC request $Req_{ATC}$ originating from the pilot domain 10, said ATC request comprising information about immediately possible flight plan changes. This ATC request $Req_{ATC}$ is transmitted by a conventional ground/on-board communication channel (voice, CPDLC datalink).

The environment module ATC Green flag is designed to determine and transmit:

- a data message data comprising the environmental optimization time slots 401-405 and the efficiency levels N1, N2, N3 associated with said slots. This message data (401-405, N1-N3) is for example transmitted on a secure ground/on-board communication channel;
- the change request $Req_{modif}$.

The environment module ATC Green flag is also designed to receive:

- the air traffic absorption capacity K for each flight information region 301, 302, 303, 304, 305.

Finally, the environment module ATC Green flag is designed to receive and transmit ground/on-board advance negotiation requests $Req_{nego}$ with the pilot domain 10. This request $Req_{nego}$ is for example transmitted on a secure ground/on-board communication channel.

The pilot domain 10 comprises all modules accessible to the pilot 11 of the aircraft 12. As has already been specified, this pilot domain 10 comprises the electronic terminal Pilot Green flag and an electronic module Pilot current.

The electronic terminal Pilot Green flag is in the form of a tablet that the pilot 11 is able to carry about their person. The pilot may thus use it to plan a flight plan before the flight or to change this flight plan in the aircraft during the flight. This electronic terminal Pilot Green flag is designed to receive:

- the message data (401-405, N1-N3) originating from the environment module ATC Green flag;
- a message $MAJ_{FMS}$ for updating the on-board flight plan originating from the electronic module Pilot current.

The electronic terminal Pilot Green flag is also designed to receive and transmit ground/on-board advance negotiation requests $Req_{nego}$ with the environment module ATC Green flag.

The electronic module Pilot current is a module that is located in the aircraft 12. This electronic module Pilot current is designed to transmit:

- an ATC request $Req_{ATC}$ to the control module ATC current control center;
- a message $MAJ_{FMS}$ for updating the on-board flight plan to the electronic terminal Pilot Green flag.

The electronic module Pilot current is designed to receive the ATC clearance authorization message. This reception makes it possible to update the flight plan on board said electronic module Pilot current.

Figure 5:
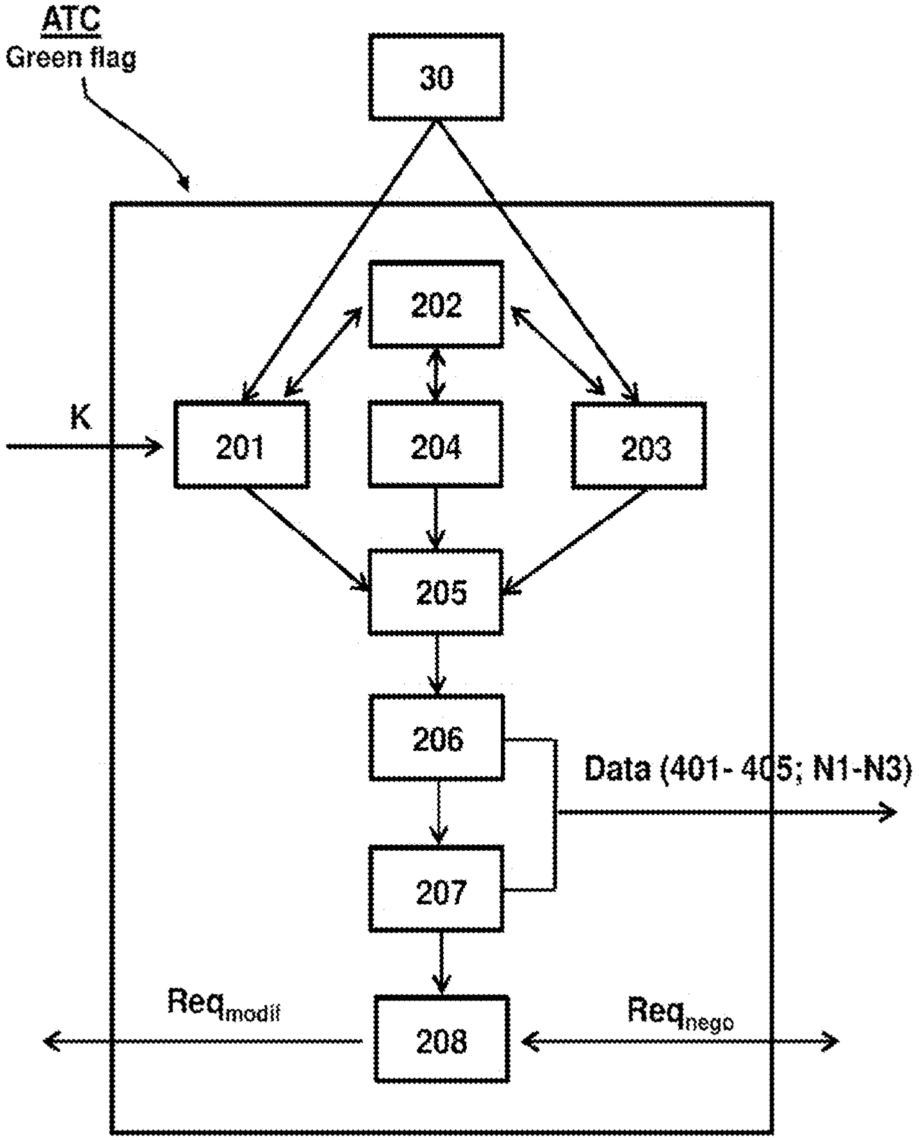
FIG. 5 schematically details the environment module ATC Green flag of FIG. 4.

FIG. 5 describes the environment module ATC Green flag of FIG. 4 in more detail.

This environment module ATC Green flag comprises:

- a plurality of parameter blocks comprising:
  - a flight information region load block 201;
  - a human resources block 202;
  - a maneuvering margin block 203;
  - an environmental objective block 204.

The flight information region load block 201 is designed to receive the air traffic absorption capacity K for each flight information region 301, 302, 303, 304, 305 from the control module ATC current control center.

The human resources block 202 is designed to determine the human resources available in the air traffic control system 20.

The maneuvering margin block 203 is designed to determine maneuvering margins in a flight plan with respect to possible procedures and the weather.

The environmental objective block 204 is designed to contain one or more environmental objectives, such as reducing $CO_2$, $NO_x$ or reducing global emission levels of GWP100 ("Global Warming Potential") type, on the basis of which changes may be made to the flight plan.

The flight information region load block 201 and the maneuvering margin block 203 are supplied, by an external provider module 30, with weather data such as meteorological aerodrome reports (METAR), aeronautical weather forecasts (TAF for "Terminal Aerodrome Forecast"), SIGMET messages ("SIGnificant METeorological Information"), data about winds, temperatures, day/night, humidity levels, etc.

The various blocks 201, 202, 203, 204 are in communication with one another and with a situation visualization block 205. This visualization block 205 is designed to summarize a situation on the basis of the various parameters received.

In addition, the situation visualization block 205 is designed to supply a definition block 206. This definition block 206 is able to define and position the various environmental optimization time slots 401-405.

Based on these various time slots, an identification block 207 is designed to identify possible optimization types per slot and to define possible maneuvering margins per slot. The various environmental optimization time slots 401-405 and the possible maneuvering margins are transmitted via the message data (401-405; N1-N3) from the definition block 206 and the identification block 207

The environment module ATC Green flag also comprises an optimization block 208. This optimization block 208 is designed to optimize the air traffic control system. To this end, it comprises:

- means for measuring the environmental optimization time slots 401-405 on the flight plans and the associated differences from the reference flight plan;
- means for identifying flights for which optimization is possible;
- means for identifying possible optimizations;
- means for evaluating the consequences of the optimizations on the environment and on traffic (unqualified "safety check");
- means for prioritizing optimizations and flights;
- means for selecting the desired flight plan changes and for identifying minimum constraints.

The optimization block 208 is thus able to provide:

- data for the ground/on-board selected flight plan change request $Req_{modif}$ to the control module ATC current control center; and
- data for the advance ground/on-board negotiation requests $Req_{nego}$ to the pilot domain 10.

Figure 6:
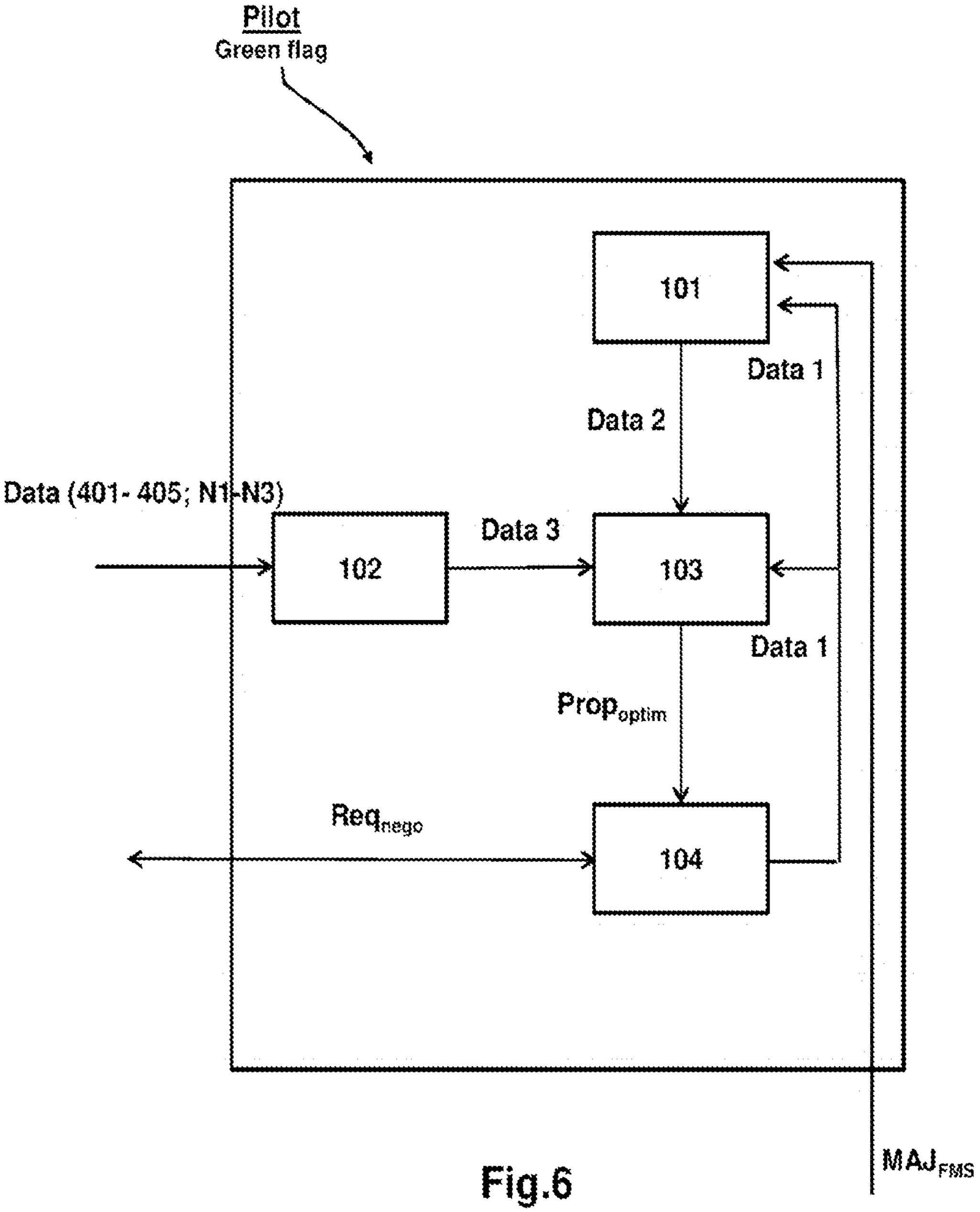
FIG. 6 schematically details the electronic terminal of FIG. 4.

FIG. 6 describes the electronic terminal Pilot Green flag of FIG. 4 in more detail.

This electronic terminal Pilot Green flag comprises:

- a reference flight plan block 101;
- a visualization block 102;
- an optimization block 103;
- a negotiation block 104.

The reference flight plan block 101 is designed to store the reference flight plan. This reference flight plan is updated based on first data data 1 originating from the negotiation block 104 and from the message $MAJ_{FMS}$ for updating the flight plan. The flight plan block 101 is then able to deliver second data data 2.

The visualization block 102 is designed to allow the pilot 11 to visualize the environmental optimization time slots 401-405 and the efficiency levels N1-N3 associated with said slots. For example, the visualization block 102 allows the pilot 11 to be presented with slots covering the flight information regions 301-305, as illustrated in FIG. 3. The visualization block 102 is designed to deliver third data data 3.

The optimization block 103 is designed to optimize the flight plan on the initiative of the pilot. This optimization block 103 thus receives, at input, the first data data 1, the second data data 2 and the third data data 3. The block 103 delivers, at output, flight plan optimization suggestions $Prop_{optim}$. To generate these various flight plan optimization suggestions $Prop_{optim}$, the block 103 comprises:

- means for measuring the environmental optimization time slots 401-405 on the flight plans and the associated differences from the reference flight plan;
- means for identifying possible optimizations. These possible optimizations are determined on the basis of operational constraints (arrival time, fuel on board, performance, etc.);
- means for evaluating the consequences of the optimizations on the flight (delay on arrival, etc.);
- means for prioritizing the possible optimizations;
- means for selecting the desired flight plan changes and identifying the minimum constraints.

The negotiation block 104 is designed to deliver the first data data 1 on the basis of the flight plan optimization suggestions $Prop_{optim}$ and advance ground/on-board negotiation requests $Req_{nego}$ originating from the environment module ATC Green flag. The negotiation block 104 is also designed to transmit advance ground/on-board negotiation requests $Req_{nego}$ to this environment module ATC Green flag.

Figure 7:
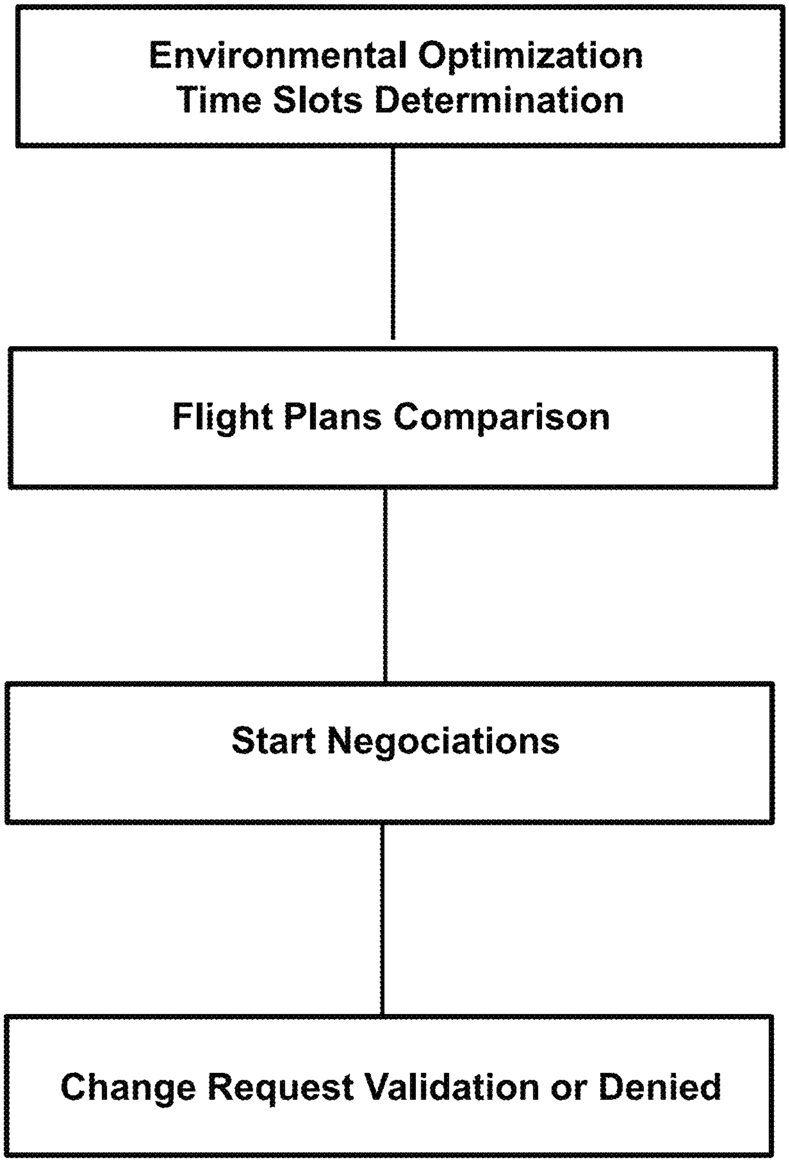
FIG. 7 illustrates the various steps of the communication method of the invention.

FIG. 7 illustrates the various steps of a method for communication between the air traffic control system 20 and the electronic terminal Pilot Green flag.

In a first step E1, environmental optimization time slots 401-405 are determined based on the air traffic absorption capacities K of the various flight information regions 301-305.

In a second step E2, the pilot 11 consults, on the ground, their flight plan from the electronic terminal Pilot Green flag. The pilot may then compare this planned flight plan with a flight plan that is optimized from an environmental point of view.

In a third step E3, the pilot decides to start negotiations with the air traffic control system 20 to optimize their flight plan from an environmental point of view. For example, the pilot sends a continuous climb optimization request via the electronic terminal Pilot Green flag. The controller of the flight departure point receives the continuous climb request notification. A conversation is then initiated between this controller and another controller. This other controller may be a controller of the arrival point or an intermediate controller of a flight information region that will be passed through by the aircraft during the flight plan.

In a fourth step E4, the controller in charge of managing the aircraft agrees to or declines the change request. The controller may also transmit their own suggestion for changes to the flight plan. This suggestion may result from the dialog with the controllers in charge of the following flight information regions passed through by the aircraft.

It should be noted that all of steps E1 to E4 may also be carried out on board the aircraft during the flight.

In addition, suggestions for changes to the flight plan may be made on the initiative of a controller. For example, the controller may identify, on their screen, a direct path between two space-times conducive to environmental optimization.

The invention thus provides a framework reflecting the optimization capabilities and the desire for environmentally friendly flight management by ATC.

By publishing environmental optimization time slots, ATC is therefore committed to a flight optimization approach in line with environmentally friendly criteria. The controller is therefore no longer a facilitator, but a fully fledged player in the process.

The proposed solution, by signaling the good intentions of the ATC, makes it possible to undertake common ground/on-board thinking more easily. It creates an incentive framework for the pilot by telling them that their optimization efforts will not be flat out rejected and that, at the least, the search for a compromise is possible and desired by both parties.

Moreover, through its evolution over time related notably to the consideration of the evolution of the external environment (traffic, weather) as well as the changing capacities of ATC, the invention also creates a framework that stimulates thinking. It then makes it possible to transition from a system in which the main mode of operation consists in applying predefined rules to a system in which new rules are created and where the predefined rules are adapted.

Moreover, the solution provided makes it possible to optimize the (horizontal and vertical) flight plan while suggesting/managing optimizations that are spread over multiple flight information regions.

The invention claimed is:

1. A method for communication between an air traffic control system and a communication module, said communication module being an electronic terminal designed to be used before a start of an aircraft flight and/or in flight to negotiate changes to a planned flight plan of said aircraft for an airspace, said air traffic control system being designed to be used by at least one air traffic controller to control air traffic in the airspace, said airspace being divided into a plurality of flight information regions, each flight information region having a certain capacity (K) to absorb said air traffic, said communication method comprising:

- determining environmental optimization time slots of the planned flight plan based on air traffic absorption capacities (K) of the various flight information regions, said environmental optimization time slots at least partially covering one or more flight information regions of the airspace;
- determining for each environmental optimization time slot, an associated efficiency level on the basis of criteria of target environmental objectives, availability of the at least one air traffic controller, maneuvering margins in the planned flight plan with respect to possible procedures and a weather;
- the method further comprising for the communication module:
  - receiving from the air traffic control system, a data message comprising environmental optimization time slot and associated efficiency levels;

transmitting and receiving negotiation requests comprising flight plan optimization suggestions based on environmental optimization time slot and associated efficiency levels; and receiving a message for updating the planned flight plan; the method further comprising for the air traffic control system:

transmitting a data message comprising flight plan optimization suggestions based on environmental optimization time slot and associated efficiency levels;

receiving and transmitting negotiation requests; and receiving and transmitting modification requests comprising one or more modifications of the planned flight plan.

2. The communication method as claimed in claim 1, further comprising implementing the communication module as a radio terminal with a digital or non-digital voice link.

3. The communication method as claimed in claim 1, wherein the environmental optimization time slots and the associated efficiency levels are determined based on at least one parameter selected from among a list of parameters comprising at least:

an environmental objective;

a maneuvering margin; and an availability of the air traffic controller.

4. The communication method as claimed in claim 1, wherein the air traffic absorption capacity (K) of the flight information regions is determined on the basis of: an air traffic volume, a complexity of said air traffic, and/or weather conditions.

5. The communication method as claimed in claim 3, wherein the environmental objective is selected from among a list of environmental objectives comprising at least:

limiting CO2 emissions;

limiting NOx emissions;

limiting CH4 emissions;

limiting water vapor emissions; and limiting effects induced by condensation trails.

6. The communication method as claimed in claim 1, wherein the changes to the flight plan are selected from among a list of changes comprising at least:

a change of trajectory of the aircraft;

a change of altitude of the aircraft; and a change of speed of the aircraft.

7. The communication method as claimed in claim 1, wherein said communication method comprises a step of the air traffic control system sending an ATC clearance authorization message to the communication module, said authorization message being designed to validate changes to the flight plan.

8. The communication method as claimed in claim 1, wherein the requests of negotiation between the communication module and the air traffic control system is carried out before the start of the aircraft flight and/or in flight.

9. An air traffic control system designed to be used by at least one air traffic controller to control air traffic in an airspace, said airspace being divided into a plurality of flight information regions, each flight information region having a certain capacity (K) to absorb said air traffic, said air traffic control system comprising:

a control module (ATC current control center), said control module being designed to determine the air traffic absorption capacity (K) for each flight information region; and an environment module, said environment module being designed to determine environmental optimization time slots of a planned flight plan based on the air traffic absorption capacities (K) of the various flight information regions, said environmental optimization time slots at least partially covering one or more flight information regions of the airspace, each environmental optimization time slot having an associated efficiency level, said environment module being designed to negotiate changes to a flight plan of an aircraft intended to pass through the airspace, said changes being determined on the basis of the environmental optimization time slots and the efficiency levels of said environmental optimization time slots.

10. The air traffic control system according to claim 9 being configured and/or operable to:

transmit a data message comprising flight plan optimization suggestions based on environmental optimization time slot and associated efficiency levels;

receive and transmit negotiation requests; and receive and transmit modification requests comprising one or more modifications of the planned flight plan.

11. An electronic terminal designed to be used before a start of an aircraft flight and/or in flight to negotiate changes to a flight plan of said aircraft, said aircraft being intended to pass through an airspace, said airspace being divided into a plurality of flight information regions, each flight information region having a certain air traffic absorption capacity (K), said electronic terminal comprising:

a visualization block for visualizing environmental optimization time slots for a planned flight plan and efficiency levels associated with said slots, said environmental optimization time slots at least partially covering one or more flight information regions of the airspace, said environmental optimization time slots and the efficiency levels associated with said environmental optimization time slots being determined based on the air traffic absorption capacities (K) of the various flight information regions; and a negotiation block, said negotiation block being designed to negotiate changes to the flight plan of said aircraft on the basis of the environmental optimization time slots and the efficiency levels of said environmental optimization time slots.

12. The electronic terminal according to claim 11 being configured and/or operable to:

receive from the air traffic control system, a data message comprising environmental optimization time slot and associated efficiency levels;

receive and transmit negotiation requests comprising flight plan optimization suggestions based on environmental optimization time slot and associated efficiency levels; and receive a message for updating the planned flight plan.

* * * * *